(12) United States Patent
Forgatsch

(10) Patent No.: US 7,338,131 B2
(45) Date of Patent: Mar. 4, 2008

(54) COMFORT SYSTEM FOR A SEAT, IN PARTICULAR FOR VEHICLE AND AIRCRAFT PASSENGER SEATS MOUNTED ONE BEHIND THE OTHER IN A ROW

(75) Inventor: Oliver Forgatsch, Meersburg (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 19 days.

(21) Appl. No.: 11/200,229

(22) Filed: Aug. 10, 2005

(65) Prior Publication Data
US 2006/0238012 A1 Oct. 26, 2006

(30) Foreign Application Priority Data
Mar. 31, 2005 (DE) .................... 10 2005 015 142

(51) Int. Cl.
*A47C 7/50* (2006.01)
(52) U.S. Cl. .............................. 297/423.15; 297/188.08
(58) Field of Classification Search ........... 297/423.15, 297/188.08, 188.12, 188.13
See application file for complete search history.

(56) References Cited
U.S. PATENT DOCUMENTS

| 1,389,209 | A | * | 8/1921 | Myatt | 296/75 |
| 2,591,598 | A | * | 4/1952 | Owler | 297/423.15 |
| 3,556,590 | A | * | 1/1971 | Harris | 297/423.15 |
| 5,556,167 | A | * | 9/1996 | Johnson Siemion | 297/423.15 |
| 6,053,570 | A | * | 4/2000 | Stern et al. | 297/188.08 |
| 6,375,266 | B1 | * | 4/2002 | Ferguson et al. | 297/423.15 |
| 6,832,741 | B2 | * | 12/2004 | Jarosz | 244/122 R |
| 7,108,329 | B1 | * | 9/2006 | Clough | 297/423.19 |

* cited by examiner

*Primary Examiner*—David Dunn
*Assistant Examiner*—Sarah B McPartlin
(74) *Attorney, Agent, or Firm*—Roylance, Abrams, Berdo & Goodman, L.L.P.

(57) ABSTRACT

A comfort system for a seat, in particular for vehicle and aircraft passenger seats mounted one behind the other in a row, has at least one support component (1) movable from a non-use position to a use position. Foot and leg components (3, 5) of a seat occupant rest on at least one support surface. The support component (1) is held in the use position by a fastening mechanism (15) and extends at least in part into a foot space which may be used by the occupant of the rear seat of two seats mounted in a row. The support component (1) clears the foot space when the component is in the non-use position and is essentially flexible. When in the use position, the fastening mechanism (15) at least in part follows a curved path, and is mounted on the front seat of two seats mounted in a row.

10 Claims, 2 Drawing Sheets

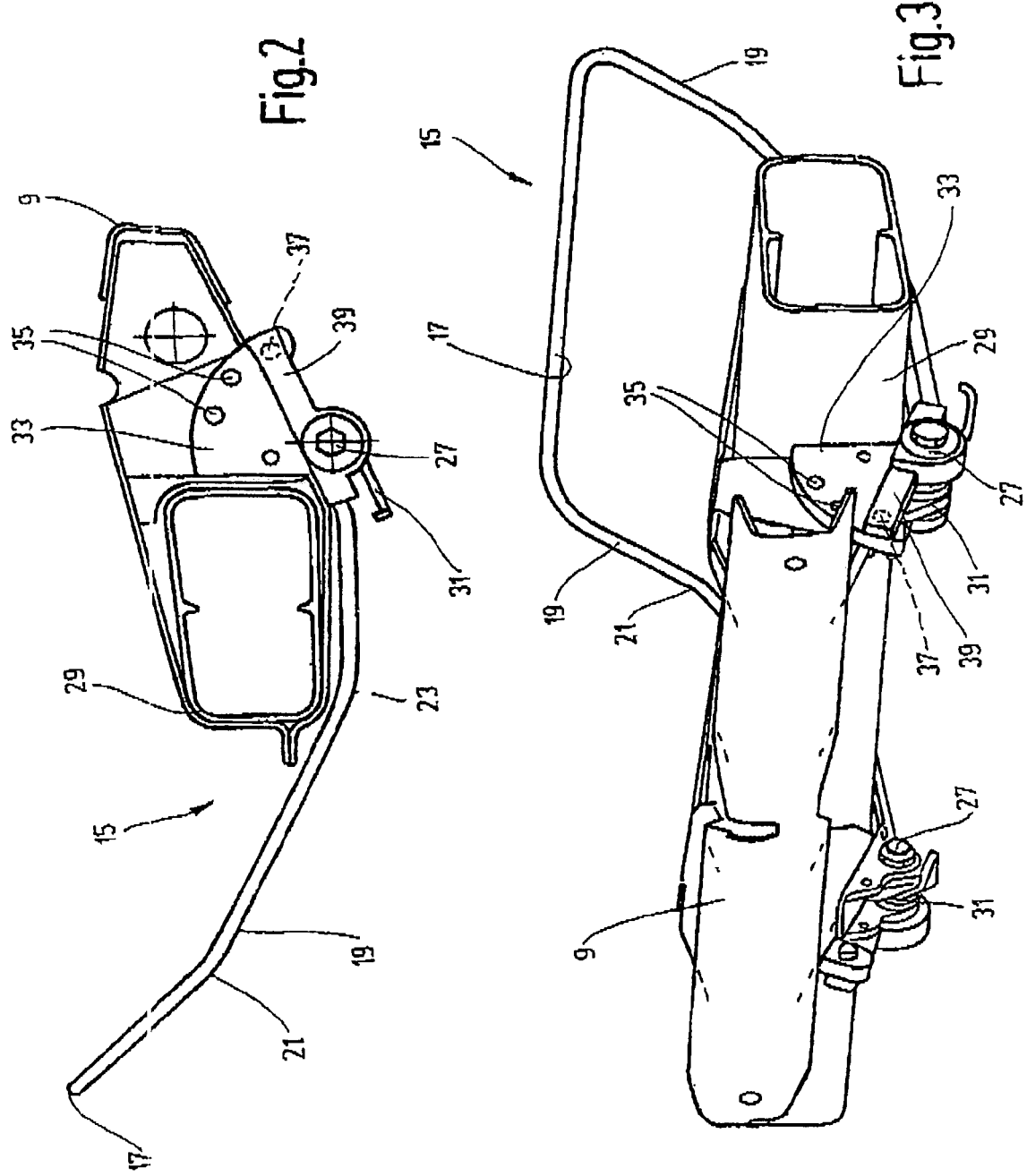

COMFORT SYSTEM FOR A SEAT, IN PARTICULAR FOR VEHICLE AND AIRCRAFT PASSENGER SEATS MOUNTED ONE BEHIND THE OTHER IN A ROW

FIELD OF THE INVENTION

The present invention relates to a comfort system for a seat, in particular for vehicle and aircraft passenger seats mounted one behind the other in a row. The seat has at least one support component which may be moved from a non-use position to a use position in which the foot and leg components of a seat occupant rest on at least one support surface. The respective seat component is held in the use position by a fastening mechanism, extending at least in part into a foot space which may be used by the occupant of the rear seat of two seats mounted in a row. The support component clears the foot space when the component is in the non-use position.

BACKGROUND OF THE INVENTION

A comfort system is disclosed in U.S. Pat. No. 5,352,020 for an aircraft passenger seat. Such comfort systems customarily have a support component in the form of an extendable telescoping carrier which is pivot-mounted in the front edge area of the seating surface of the seat and which in the non-use position may be folded downward toward the cabin floor to assume a shortened, collapsed condition. This carrier may be pivoted toward the front upward from the non-use position, so that it extends, tilted in relation to the vertical in the foot space, to an area below the backrest of the seat immediately to the front in the row. Support surfaces providing support for the feet of the occupant are obtained through extension, that is, telescopic lengthening, of the carrier.

It is a disadvantage that the rigid carrier forms support surfaces extending in one plane. Shaped upholstered supports are required to provide a pleasant, physiologically adapted surface supporting the feet of the seat occupant. Another specific disadvantage is represented by the fact that considerable construction effort is required for the telescoping carrier and the associated adjustable fastening mechanism. This structure entails high production costs and very high structural weight. This cost and weight present disadvantages, especially in the case of aircraft passenger seats.

SUMMARY OF THE INVENTION

An object of the present invention is to provide a comfort system which may be produced cost-effectively by simple means and yet affords the seat occupant increased comfort in the form of comfortable support.

This object is attained according to the present invention by a comfort system which, in place of a rigid, hinged, structural component of variable horizontal length, an essentially flexible support element is provided. Since its fastening mechanism is mounted on the front seat of two seats mounted one behind the other, the flexible support is curved when extended into the use position from the front into the foot space. Its curvature closely adjoins the supported feet components of the seat occupant. An especially comfortable physiognomically favorable support of the respective feet components is thereby achieved, without the need for shaped upholstery components, so that maximum comfort is achieved. At the same time, an appreciable saving of weight is obtained compared with the conventional system, as a result of elimination of the adjustment cinematics required for the customary rigid telescoping extendable support components. An additional advantage is gained of extremely low production costs.

Preferably, the fastening mechanism is mounted in the front area of the underside of the associated seat. Since the area below the forward seat of two seats positioned one behind the other is used as foot space for the passenger of the seat to the rear in vehicles for transporting passengers, passenger aircraft in particular, only a structural length which is relatively small in relation to the longitudinal direction of the seat is required for the support component in this configuration for forming the desired support for the feet components of the passenger.

The fastening mechanism may be configured so that it retains the support component detachably in the non-use position near the underside of the seat. When not in use, that is, when stowed, only a very small amount of space is required for the flexible support component. Because of its flexibility, it can closely adjoin the underside of the seat, so that virtually the entire foot space remains free and unimpeded when the component is in the non-use position.

By preference, the flexible support component has at least one strip-like path forming at least a part of the support surface. If this path is made, in one especially advantageous exemplary embodiment, of a fabric or mesh, preferably in the form of a net of a material selected to ensure fire safety, the support component may be in the form of a foot net suspended from the fastening mechanism. The feet of the seat occupant may be accommodated in such foot as in a hammock. A foot net made in this manner ensures particularly pleasant support of the feet of the occupant introduced into the net.

The front end of the support component, preferably in the form of a net, may be fastened in the front area of the seat structure on the underside of the associated seat. The rear edge of the support component, opposite the front fastened end of the support component in the form of a net, may be suspended by a movable carrier of the fastening mechanism. The front end of the movable carrier is mounted adjacent to the fastened front end of the support component on the carrier structure so as to pivot about an axis positioned to be transverse relative to the longitudinal direction of the seat. The rear end projects to the rear from the pivot axis and forms the attachment for the rear edge of the support component (for example a net).

In one especially simple structure light in weight, the carrier, of the fastening mechanism has a bow essentially U-shaped in outline. The bar of the outline extends transversely to the longitudinal direction of the seat. The rear edge of the support component configured as a net, for example, is fastened to the bar. The sides of the outline extend in the longitudinal direction along the side edges of the support component, and are hinge-connected to form the pivot bearing on the seat structure.

A spring configuration is present which prestresses the sides of the bow into a pivot position near the underside of the seat corresponding to the non-use position of the net from which the bow may be moved against the force of the spring to assume the use position. Handling, that is, transfer to the use position and stowing of the support component (a net, for example) for non-use, is found to be especially simple.

By preference, the pivot bearing of the bow has a detent mechanism by which the pivoting movement of the bow may be detachably locked in at least one preferred pivot position. The detent mechanism may, for example, be configured so that a locked position is provided for the use position, one in which the rear end of the bow and rear end of the net suspended on it are positioned a distance from the cabin floor such that the feet of the seat occupant may be accommodated in a hammock-like trough formed by the net.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a side elevational view exclusively of the area of a transverse support beam of the seat structure shown in FIG. 1, with fastening mechanism hinge-connected to it for the foot net as in the exemplary embodiment illustrated in FIG. 1; and FIG. 3 is a perspective diagonal view of the feature shown in FIG. 2.

DETAILED DESCRIPTION OF THE INVENTION

Figure 1:
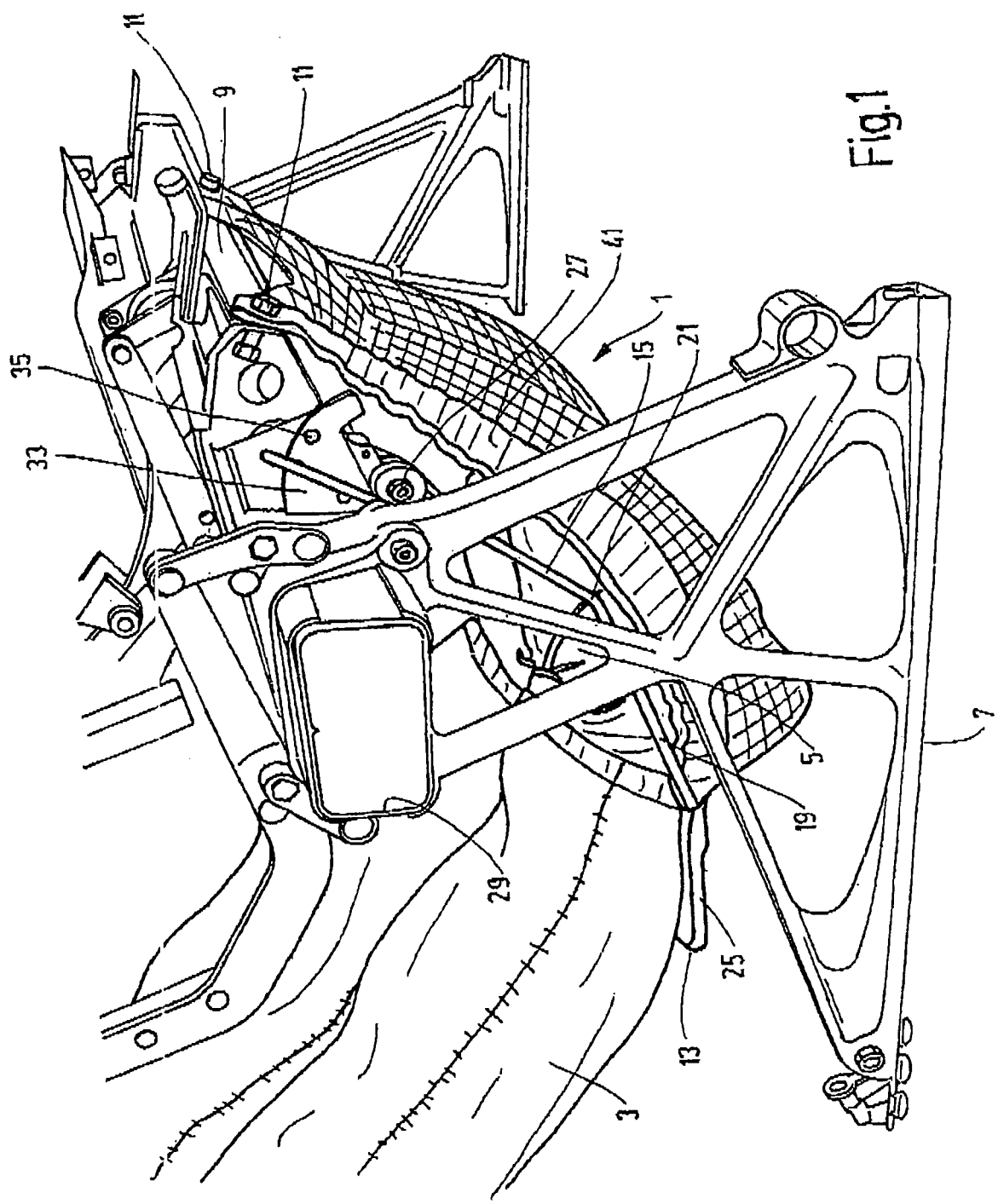
FIG. 1 is a simplified diagrammatic detached diagonal perspective view exclusively of the essential structural elements of the seating area of an aircraft passenger seat, without the cover, upholstery, additional mechanisms, or the like, but provided with an exemplary embodiment of the comfort system of the present invention in the form of a foot net, shown in the use position with the feet components of a user accommodated in the foot net.

The comfort system of the present invention is explained in the present description on the basis of an exemplary embodiment. A support component is in the form of a foot net 1 is associated with an aircraft passenger seat, which seat is part of a row of seats mounted one behind another. Behind the seat shown in FIG. 1 is a corresponding additional seat (not shown) for the occupant having a lower leg 3 and placing his shoes 5 in the foot net 1. In FIG. 1, the foot net 1 is shown in the use position, and is suspended so that the shoes 5 are accommodated in the foot net 1 a short distance above the cabin floor 7. The foot net 1, because of its flexibility, closely adjoins the shoes 5 of the occupant in the fashion of a hammock.

As is shown in FIG. 1, the foot net 1 is fastened at its front end to a front end strip 9 of the seat structure by fastening screws 11. The screws 11 are positioned adjacent to the associated side edge of the foot net 1. A fastening mechanism with movable carrier on which the rear end 13 of the foot net 1 is suspended is present as carrier for the foot net 1. The carrier is freely suspended from the end strip 9 for retaining the foot net 1 in the use position shown in FIG. 1 and for transferring it to a non-use position.

The fastening mechanism has a movable carrier in the form of an integral bent bow 15 of round spring steel. As is shown more distinctly in FIGS. 2 and 3, the bow 15 is U-shaped in outline, with a straight rear transverse portion 17 (FIG. 3) and longer side portions 19 extending in the longitudinal direction of the seat and bent slightly outward at bending points or bends 21 and 23. The rear end 13 of the foot net 1 is suspended on the rear transverse portion 17 of the bow 15 by an end pouch 25 of the foot net 1 accommodating the corresponding end component of the bow 15.

The ends of the side portions 19 opposite the transverse portion of the bow 15 are hinge-connected below a transverse support beam 29 of the seat structure. The side portion ends are displaced slightly forward of this beam 29, and are coupled to a pivot bearing 27. The pivot bearing defines for each side portion 19 a pivot axis extending transversely to the longitudinal direction of the seat.

FIGS. 2 and 3 show the bow 15 in the pivot position immediately adjacent to the underside of the seat. This pivot position corresponds to the non-use position. Because of the slightly curved shape of the side portions 19 of the bow 15 at the bending points 21 and 23, the bow of this pivot bearing is in close contact with the underside of the seat. The foot net 1, when in the non-use position, closely adjoins the underside of the respective seat, and accordingly needs very little stowage space and leaves the foot space more or less clear. The bow 15 is prestressed into this pivot position by a rotary spring mechanism which has a wrap or torsional spring 31 enclosing the pivot pin on each pivot bearing 27. To pivot the bow 15 against the active force of the spring to move the foot net 1 into the use position, the seat occupant need only apply pressure to the end 13 of the foot net 1, and accordingly to the transverse portion 17 of the bow 15 to move the foot net 1 into the position shown in FIG. 1. As is clearly shown in FIGS. 2 and 3, there is associated on each pivot bearing 27, for the respective end of the side portion 19 of the bow 15, a detent mechanism. The detent mechanism has a locking disk 33 with locking recesses 35 fastened on the seat structure. A spring-loaded locking ball 37 on a locking arm 39 shown only in FIGS. 2 and 3 may be engaged in recesses 35.

The locking mechanism may be configured so that the side portion 19 may be detachably engaged in the position shown in FIG. 1, in which position the transverse portion 17 of the bow 15 is positioned above the cabin floor 7, but may be moved downward to the cabin floor 7 by a greater amount of force, so that deformation of the bow 15 may be prevented if an inordinate amount of force is applied (as a result of vandalism, for example).

As FIG. 1 shows, the foot net 1 is provided with a side enclosure 41 extending from the rear end pouch 25 to the front end of the foot net 1 on the fastening screws 11. This enclosure 41 may be in the form of elastic bands.

As is to be seen in the figures, the foot net 1 extends in keeping with the shape, size, and mounting of the bow 15 essentially over the entire width of the seat component. The locking mechanism may be configured so that, when the foot net 1 is in the use position, the occupant may, without application of excessive force and with the support of the springs 31, apply the tips of the feet to the rear end 13 of the foot net 1 so that these springs 31 may transfer the foot net 1 to the non-use position in which the latter is stored on the underside of the seat.

While one embodiment has been chosen to illustrate the invention, it will be understood by those skilled in the art that various changes and modifications can be made therein without departing from the scope of the invention as defined in the appended claims.

What is claimed is:

1. A comfort system for a seat mounted in a row of seats located one behind another, comprising:
at least one flexible support component movable between a non-use position and a use position and having at least one support surface on which foot and leg components of a seat occupant can rest in said use position, said support component having a front end mounted on a front part of an underside of a front seat of two seats mounted in a row; and a fastening mechanism holding said support component in said use position to extend along a curved path into a foot space usable by the seat occupant in a rear seat of said two seats mounted in a row and allowing clearing of said foot space when said support component is in said non-use position, said fastening mechanism being mounted on said front part of said underside of said front seat of said two seats mounted in a row and releasably retaining said support component in said non-use position, said non-use position being near said underside, said fastening mechanism having a movable carrier mounted at a front end thereof adjacent said front end of said support component to pivot about a pivot axis perpendicular to a longitudinal direction of said two seats, said carrier having a rear end projecting rearwardly and suspending a rear end of said support component.

2. A comfort system according to claim 1 wherein said support component has at least one strip shaped path forming a part of said support surface.

3. A comfort system according to claim 2 wherein said path is a fabric or mesh.

4. A comfort system according to claim 3 wherein said mesh is a net.

5. A comfort system according to claim 4 wherein said fabric or mesh is fire resistant.

6. A comfort system according to claim 1 wherein said carrier is a U-shaped bow having a rear portion extending transverse to said longitudinal direction and side portions extending from said rear portion, said rear portion being fastened to a rear end of said support component, said side portions extending along side edges of said support component, front ends of said side portions being hingedly connected to said front seat to form a pivot bearing.

7. A comfort system according to claim 6 wherein a spring is connected to said bow and biases said bow towards a pivot position adjacent said underside and corresponding to said non-use position of said support component, said bow being movable away from said underside against biasing forces of said spring for movement of said support component to said use position.

8. A comfort system according to claim 7 wherein said spring is a torsion spring surrounding said pivot axis at each of said side portions.

9. A comfort system according to claim 7 wherein said pivot bearing has a detent mechanism for detachably retaining said bow in at least one preferred pivot position.

10. A comfort system according to claim 6 wherein said pivot bearing has a detent mechanism for detachably retaining said bow in at least one preferred pivot position.

* * * * *